(12) United States Patent
Fahl et al.

(10) Patent No.: US 8,974,001 B2
(45) Date of Patent: Mar. 10, 2015

(54) MOTOR VEHICLE SEAT AND METHOD FOR TRANSFERRING A SEATBACK FROM THE USE POSITION TO A STOWED POSITION

(75) Inventors: Michael Fahl, Overath (DE); Tobias Ewald, Hueckeswagen (DE)

(73) Assignee: Johnson Controls GmbH (DE)

( * ) Notice: Subject to any disclaimer, the term of this patent is extended or adjusted under 35 U.S.C. 154(b) by 245 days.

(21) Appl. No.: 13/387,132

(22) PCT Filed: Jul. 30, 2010

(86) PCT No.: PCT/EP2010/004667
§ 371 (c)(1),
(2), (4) Date: Feb. 23, 2012

(87) PCT Pub. No.: WO2011/015315
PCT Pub. Date: Feb. 10, 2011

(65) Prior Publication Data
US 2012/0139317 A1  Jun. 7, 2012

(30) Foreign Application Priority Data

Aug. 5, 2009 (DE) .......................... 10 2009 036 138
Jun. 15, 2010 (DE) .......................... 10 2010 023 765

(51) Int. Cl.
*B60N 2/02* (2006.01)
*B60N 2/20* (2006.01)
*B60N 2/22* (2006.01)
*B60N 2/235* (2006.01)

(52) U.S. Cl.
CPC .............. *B60N 2/206* (2013.01); *B60N 2/2222* (2013.01); *B60N 2/2352* (2013.01); *B60N 2205/30* (2013.01)
USPC ..................................................... 297/378.12

(58) Field of Classification Search
USPC ......................................... 297/378.12, 378.1
See application file for complete search history.

(56) References Cited

U.S. PATENT DOCUMENTS

| | | | |
|---|---|---|---|
| 6,464,299 B1 * | 10/2002 | Castagna ................. | 297/378.12 |
| 6,513,876 B1 * | 2/2003 | Agler et al. ............... | 297/378.14 |
| 6,773,067 B2 * | 8/2004 | Kim .............................. | 297/334 |

FOREIGN PATENT DOCUMENTS

| | | |
|---|---|---|
| DE | 10226586 | 12/2002 |
| FR | 2899161 | 10/2007 |
| FR | 2899161 A1 * | 10/2007 |

OTHER PUBLICATIONS

International Search Report, PCT/EP2010/004667, dated Oct. 4, 2010.

\* cited by examiner

*Primary Examiner* — Milton Nelson, Jr.
(74) *Attorney, Agent, or Firm* — The Dobrusin Law Firm, P.C

(57) ABSTRACT

The invention relates to a motor vehicle seat, in particular to a rear seat for rear rows of seats of motor vehicles. Furthermore, the invention relates to a method for shifting a first and second component relative to a base part.

19 Claims, 11 Drawing Sheets

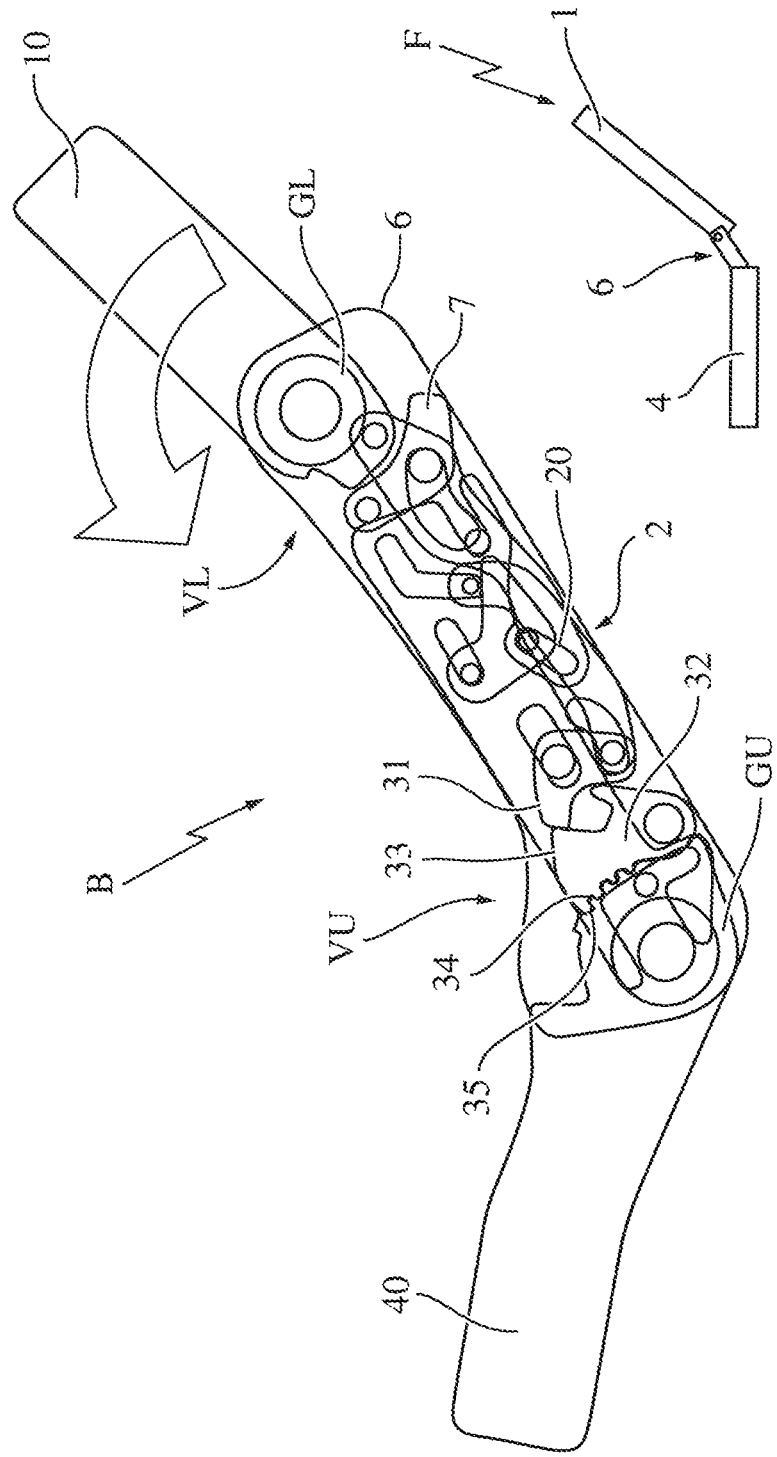

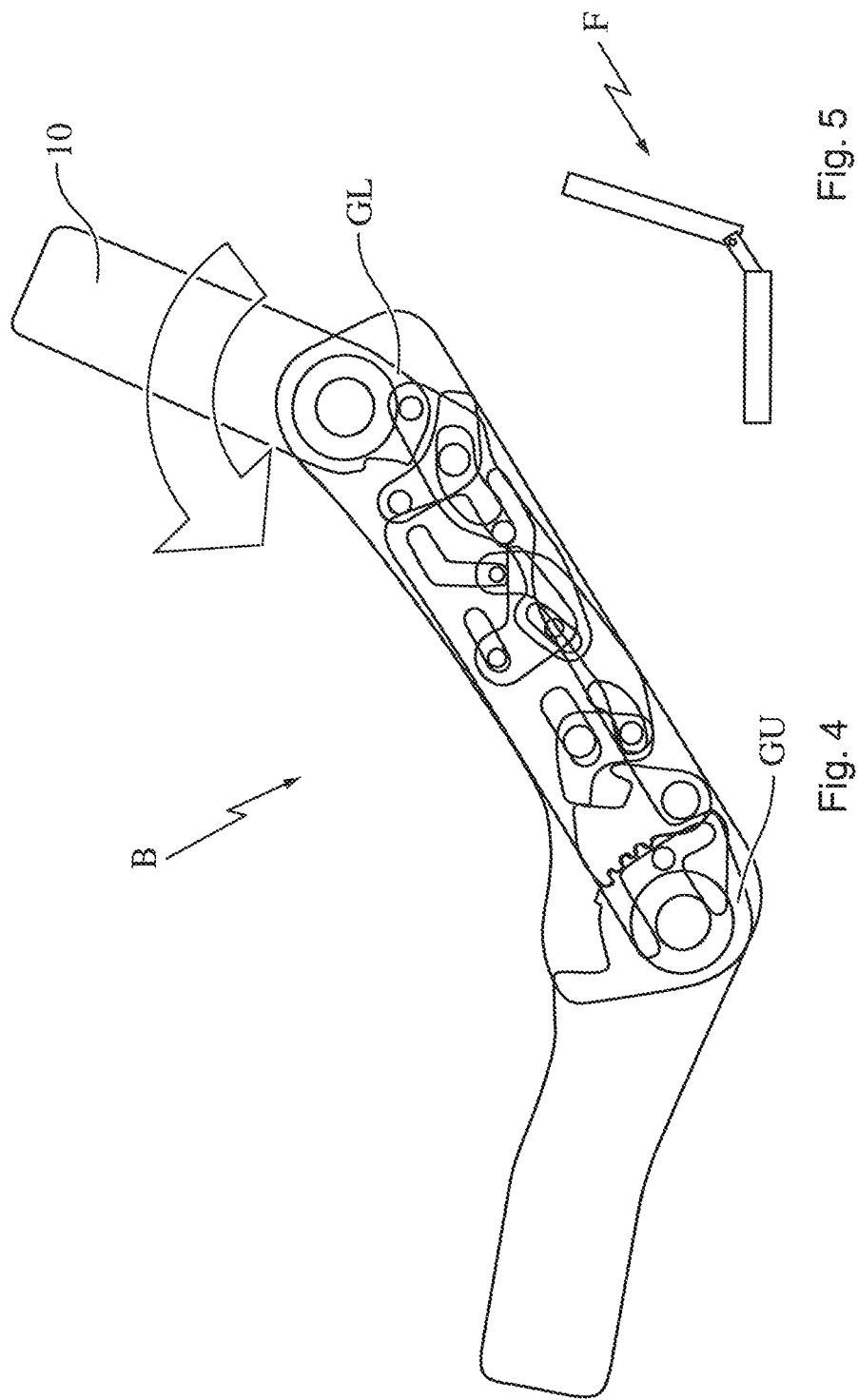

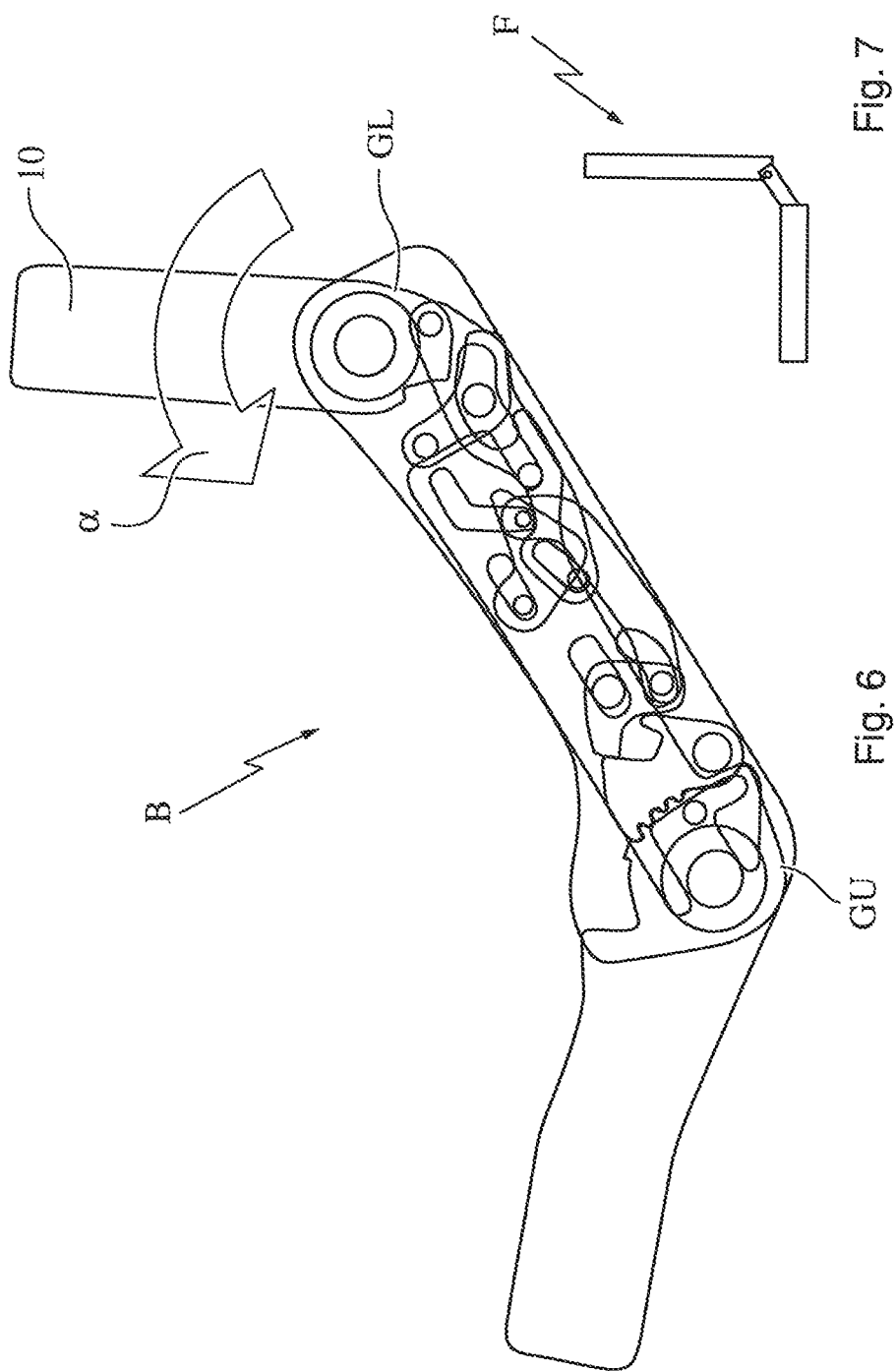

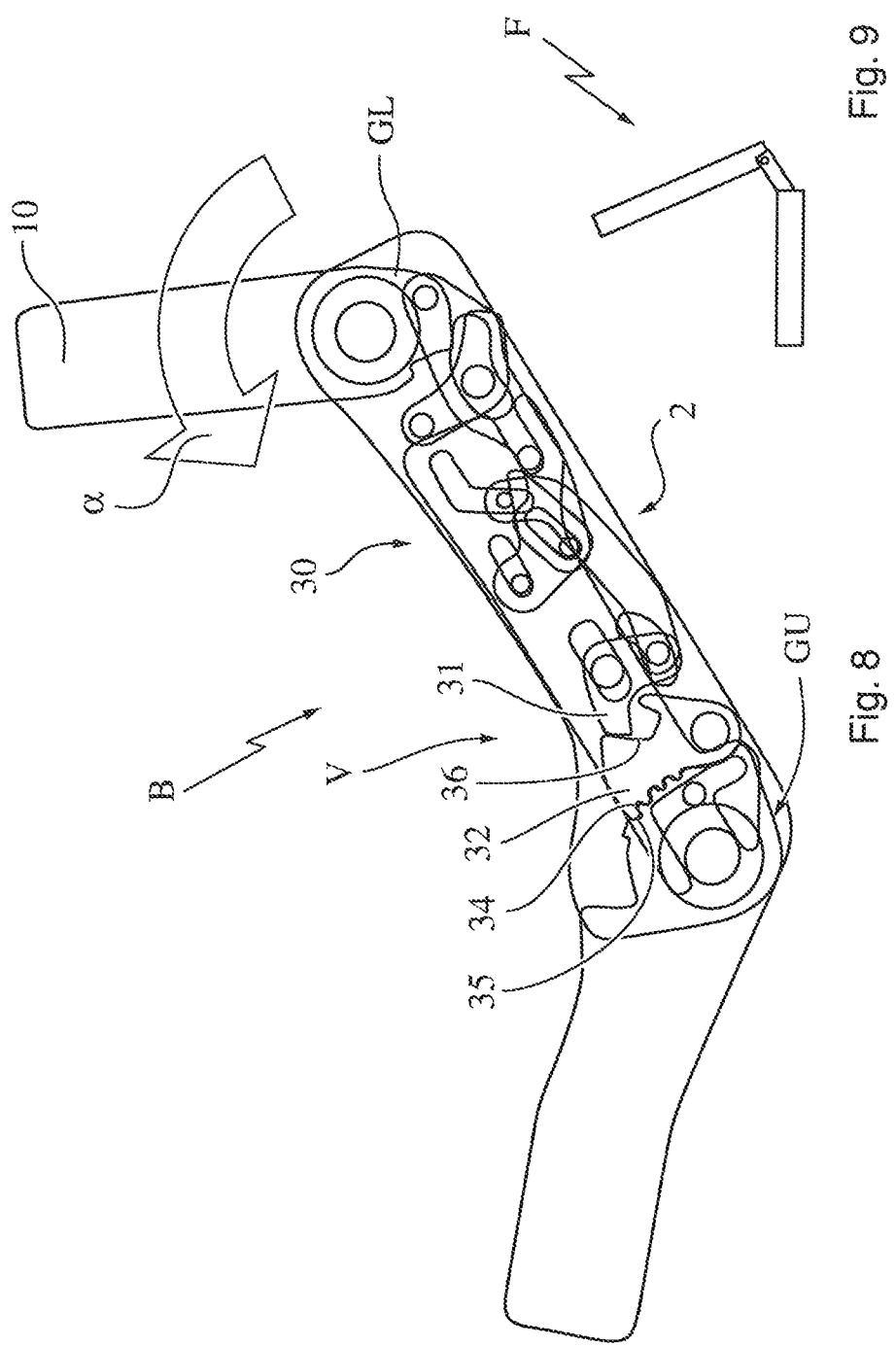

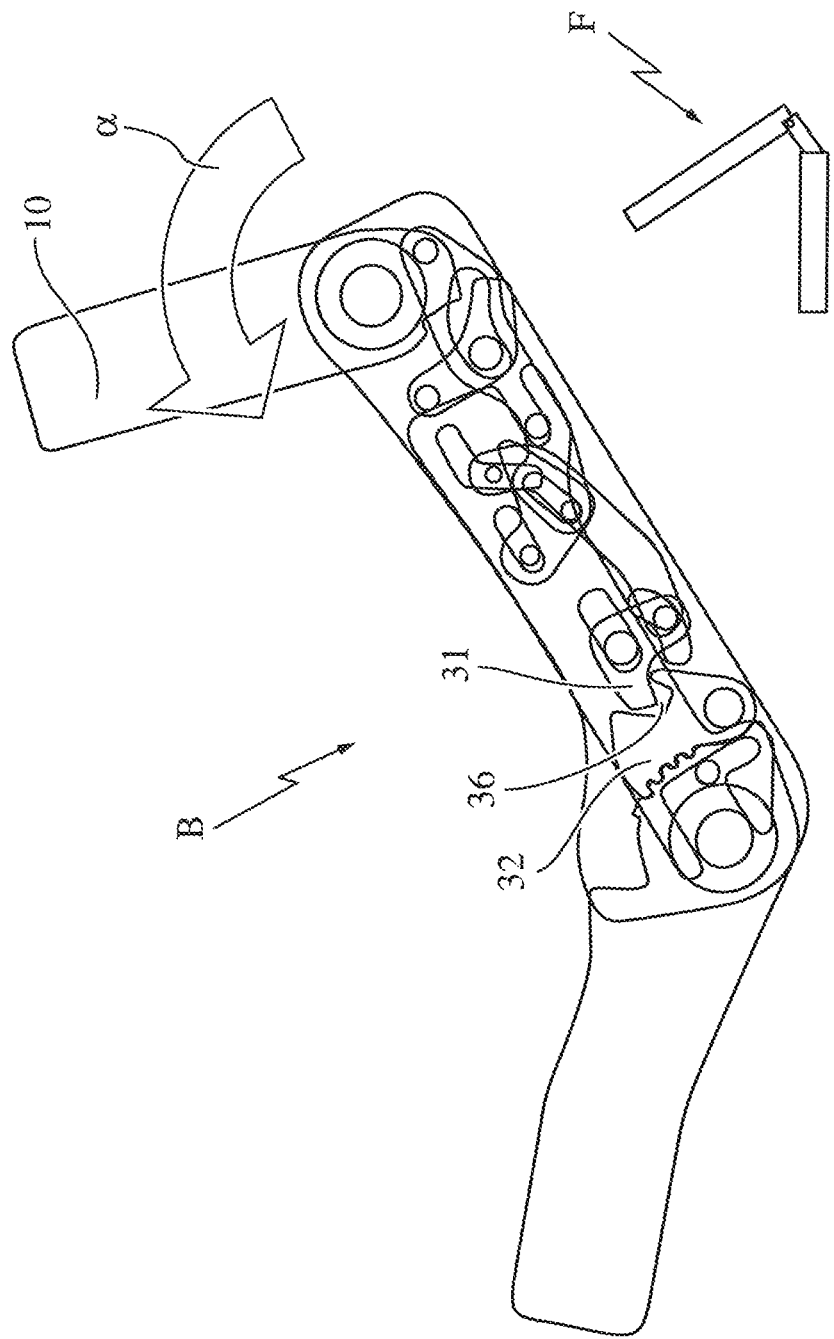

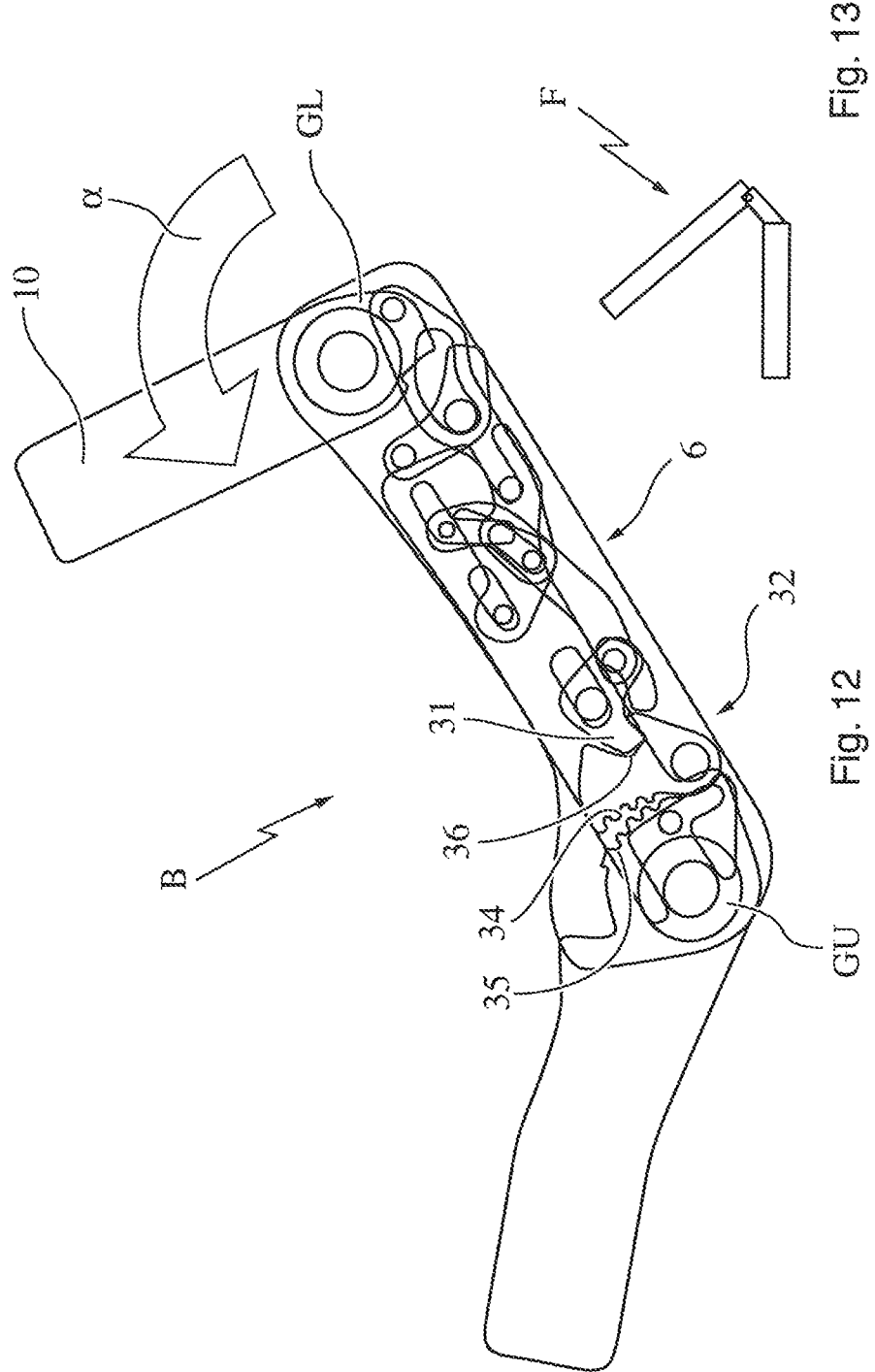

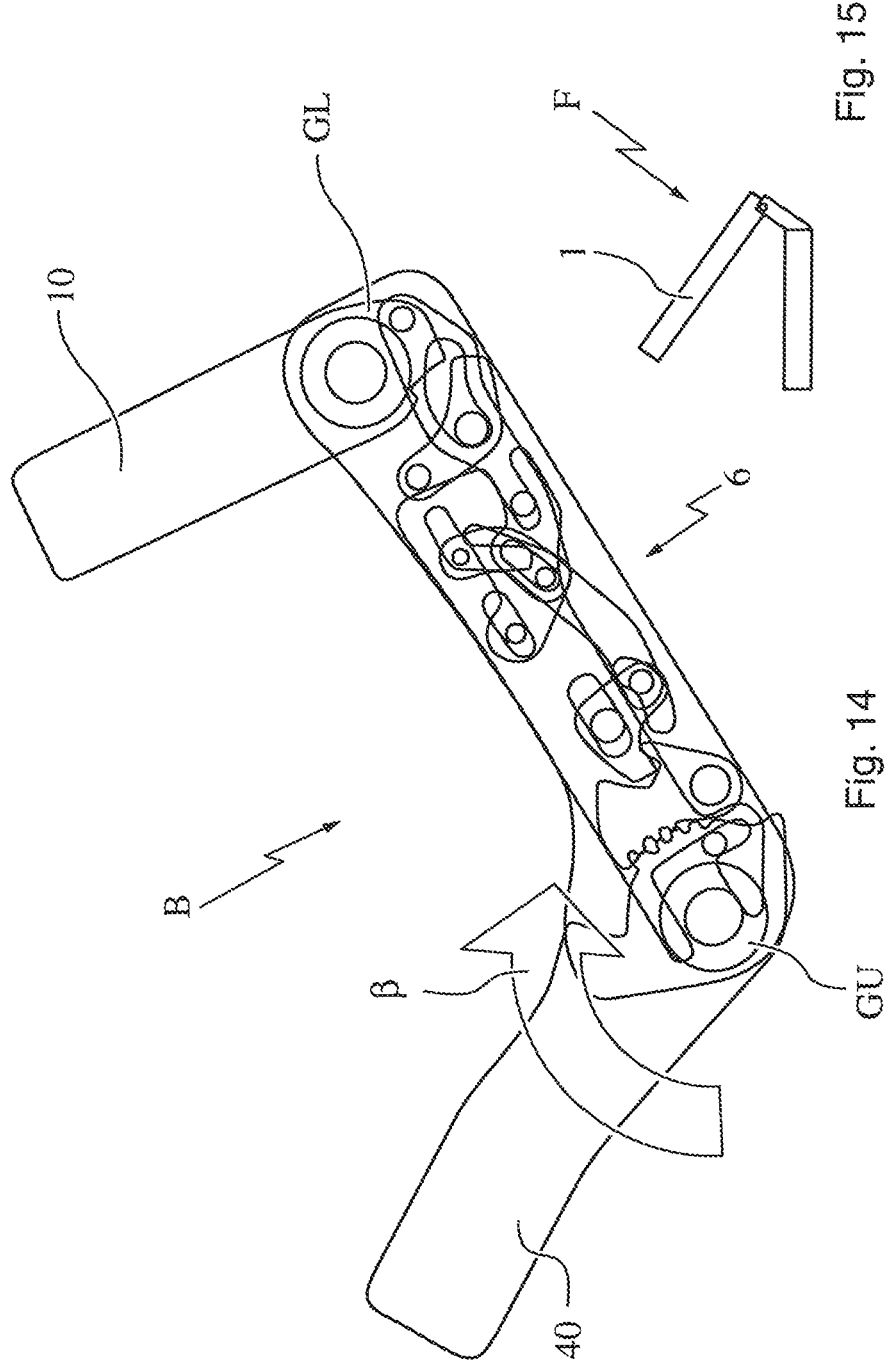

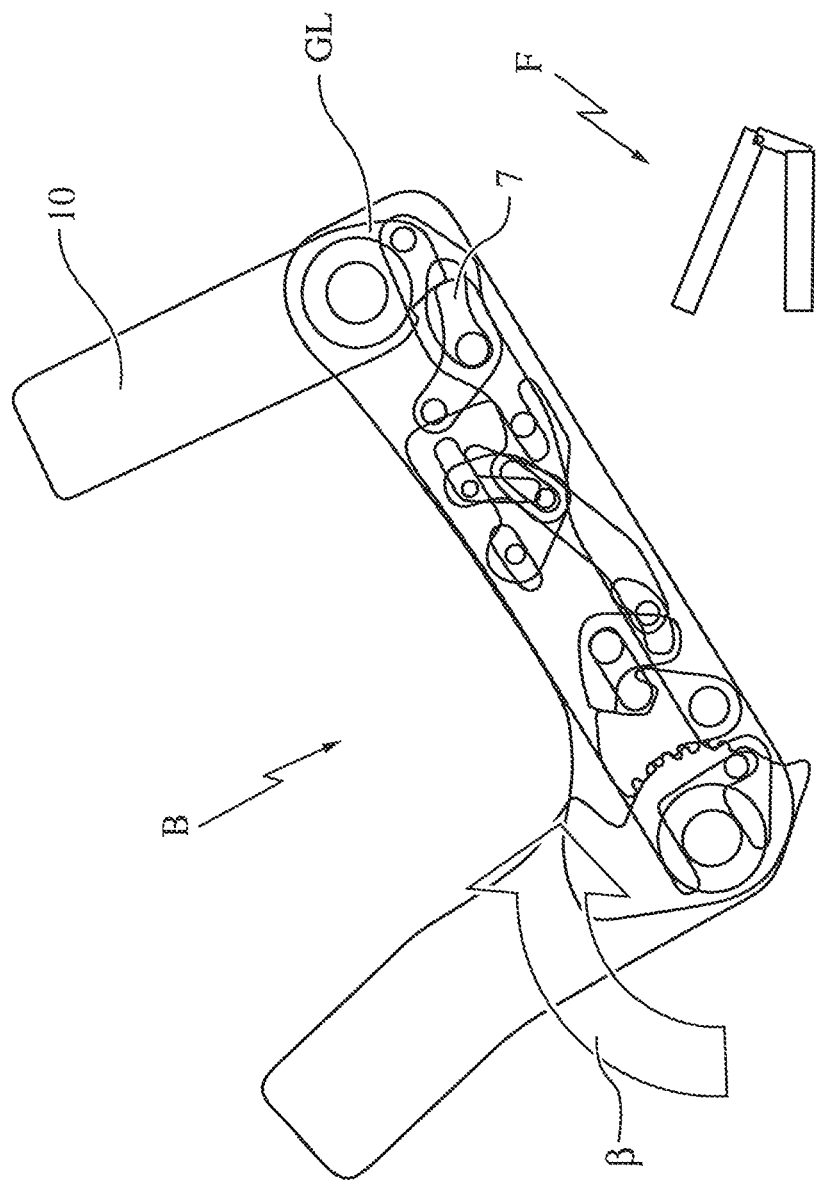

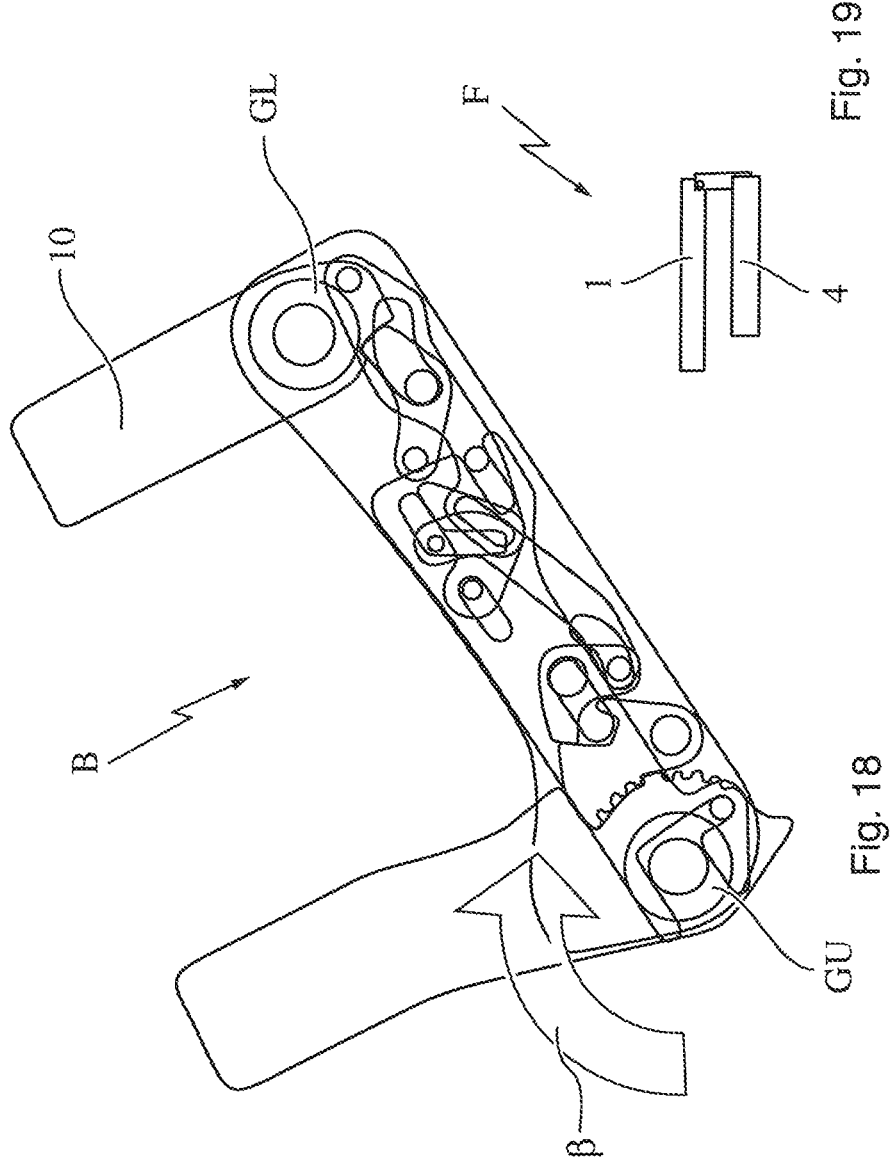

MOTOR VEHICLE SEAT AND METHOD FOR TRANSFERRING A SEATBACK FROM THE USE POSITION TO A STOWED POSITION

CLAIM OF PRIORITY

This application claims priority from German application serial number 10 2009 036,138.3 filed 5 Aug. 2009 and German application serial number 0.10 2010 023,765.5 filed 15 Jun. 2010, and is a national application based on PCT Application International Application PCT/EP2010/004667, filed 30 Jul. 2010 (published as WO2011/015,315) and claims the benefit of the filing date of 30 Jul. 2010, all incorporated herein by reference.

The invention relates to a motor vehicle seat, in particular a rear seat for rear seat rows of motor vehicles. The invention further relates to a method for shifting a first and a second component relative to a base part, wherein the first and the second component are in each case connected to each other by a first rotational means and the second component and the base part are in each case connected to each other by a second rotational means.

Motor vehicle seats which are designed to be folded to obtain additional storage space are currently available on the market in many designs.

The object of the invention is to propose a method for folding down a seatback from the use position to the stowed position and a novel, foldable vehicle seat, wherein the vehicle seat is of simple design and may be operated without substantial prior knowledge on the part of the user and has a smaller space requirement in the folded up state.

The object is achieved by a method for shifting a first and a second component relative to a base part, wherein the first and the second component are in each case connected to each other by a first rotational means and the second component and the base part are in each case connected to each other by a second rotational means, wherein the first and second rotational means are automatically locked and unlocked depending on at least one position of the first component relative to the second component and/or the second component relative to the base part.

The method according to the invention relates, for example, to shifting a seatback, the first component, relative to a seat part, the base part, from a use position, in which the seatback is provided substantially perpendicular to the seat part, preferably via a so-called easy entry position known to the person skilled in the art, to a stowed position in which the seatback is provided substantially parallel to the seat part.

Between the first component, for example the seatback, and the base part, for example the seat part, a second component is provided which is movably, in particular rotatably, connected both to the first component and to the base part. To this end, first and second rotational means, in particular pivot pins, are provided which are preferably arranged parallel to one another.

According to the invention, it is now provided that the first and the second rotational means are automatically locked and unlocked depending on at least one position of the first component relative to the second component and/or of the second component relative to the base part. As a result, by simple rotation of the seatback the user is able to transfer the seat from the use position into the stowed position, without any other actions, such as for example pushing buttons, pulling levers or the like being necessary.

Preferably, the first component, for example the seatback, may be shifted, in particular rotated, by an angle relative to the second component, wherein the second component remains locked in a first position relative to the base part, for example the seat part. This function is important, in particular, for comfort adjustment. The pitch angle of the seatback may be adjusted about its vertical position without the locking between the second component and the seat part being released.

When rotating the first component, for example the seatback, beyond a specific angle, the second rotational means is automatically unlocked and/or the first component is brought into contact with a stop provided on the second component. This function permits, for example, the seatback to be transferred into an easy entry position.

Preferably, with a relative movement, in particular a further relative movement, between the second component and the base part, a locking means of the first component is automatically brought into a lockable position, i.e. the locking means could lock the first component relative to the second component, but has not yet locked it.

Preferably, a locking means of the second component is also automatically brought into a lockable second position relative to the base part, preferably at the same time as the locking means of the first component, i.e. said locking means could lock the second component relative to the base part, but has not yet locked it.

Preferably, both components are automatically locked in their respective positions after the component has reached its end position. This position is, for example, the stowed position of the seatback parallel to the seat part.

Preferably, the locking takes place by a latching means, in particular a latching pawl. Preferably, the second component, in particular after it has been brought into its second position, for example the stowed position of the seatback, has to be unlocked in a manual or motorized manner.

Preferably, the unlocking of the first component takes place automatically with the movement of the component and the base part relative to one another.

In a preferred embodiment of the present invention, with a movement of the first component and the second component relative to one another and/or with a movement of the second component relative to the base part, the first component is automatically shortened or lengthened.

Preferably, the first component is the seatback and/or the base part is the seat part of a vehicle seat.

A further subject of the present invention is a vehicle seat comprising a seatback, an intermediate part and a base part, wherein the seatback and the intermediate part are in each case connected to each other by a first rotational means and the intermediate part and the base part are in each case connected to each other by a second rotational means, which in each case are able to be locked in at least one position by a locking means, wherein the locking means are operatively connected by a means so that with a relative movement between the seatback and the intermediate part, and/or the intermediate part and the base part, at least one locking means is automatically locked and unlocked. Particularly preferably, said means are moved in a purely translatory manner.

The embodiments set forth of the method according to the invention apply equally to the vehicle seat according to the invention and vice versa.

Preferably, the vehicle seat comprises an upper fitting which may be pivoted about an upper horizontal pivot pin, to which the seatback is generally connected and which may be releasably locked via an upper locking mechanism. The vehicle seat further comprises a second component, an intermediate part, which is preferably articulated pivotably about a lower horizontal axis on a lower fitting and preferably may be releasably locked via a lower locking mechanism. The lower fitting is generally connected to a seat part.

The kinematic system of said vehicle seat is preferably designed such that the upper pivot pin is unlocked and the lower pivot pin is locked when the seatback is in a use position, i.e. in a position which is advantageous for the vehicle occupants for traveling;

the lower pivot pin is automatically unlocked as soon as the seatback reaches a predetermined angle of inclination relative to the vertical when folded forward;

the folding forward movement of the seatback is limited by first stop means, in particular in the stop position of the seatback corresponding to the predetermined angle of inclination;

after the unlocking of the lower pivot pin, with continued movement of the upper fitting, the movement of the upper fitting is transmitted to the intermediate part, the movement of the intermediate part is limited by a second stop means and, as a result, the intermediate part is stopped in a defined functional position and/or the upper and the lower pivot pin are in each case only locked when the vehicle seat according to the invention is adjusted into an end position in which the seatback is arranged in a flat position over the seat part; —the upper and the lower pivot pin in the end position of the seat only being able to be unlocked by a specific actuation of any kind on the part of a user acting on the kinematic system.

The inventions are explained hereinafter with reference to FIGS. 1-20. Said explanations are merely provided by way of example and do not limit the general idea of the invention. The explanations apply equally to both subjects of the invention.

In the drawings:

FIG. 2 shows a basic structure of the vehicle seat in a first position, the use position, in a schematic sectional view;

FIG. 3 shows a vehicle seat in a seat use position corresponding to the use position of the basic structure shown in FIG. 2, in a very schematic view;

FIG. 4 shows the basic structure of FIG. 2 with the backrest fitting folded slightly forward relative to FIG. 2;

FIG. 5 shows the vehicle seat in a seat position corresponding to the position of the basic structure shown in FIG. 4, in a very schematic view;

FIG. 6 shows the basic structure of FIG. 4 with the backrest fitting folded forward further into the upright position;

FIG. 7 shows the vehicle seat in a seat position corresponding to the position of the basic structure shown in FIG. 6, in a very schematic view;

FIG. 8 shows the basic structure of FIG. 6 with the backrest fitting folded forward even further;

FIG. 9 shows the vehicle seat in a seat position corresponding to the position of the basic structure shown in FIG. 8, in a very schematic view;

FIG. 10 shows the basic structure of FIG. 8 with the backrest fitting folded forward even further;

FIG. 11 shows the vehicle seat in a seat position corresponding to the position of the basic structure shown in FIG. 10, in a very schematic view;

FIG. 12 shows the basic structure of FIG. 10 with the backrest fitting folded forward even further;

FIG. 13 shows the vehicle seat in a seat position corresponding to the position of the basic structure shown in FIG. 12, in a very schematic view;

FIG. 14 shows the basic structure of FIG. 12 with the backrest fitting folded forward even further;

FIG. 15 shows the vehicle seat in a seat position corresponding to the position of the basic structure shown in FIG. 14, in a very schematic view;

FIG. 16 shows the basic structure of FIG. 14 with the backrest fitting folded forward even further;

FIG. 17 shows the vehicle seat in a seat position corresponding to the position of the basic structure shown in FIG. 16, in a very schematic view;

FIG. 18 shows the basic structure of FIG. 16 with the backrest fitting folded forward further into the horizontal end position;

FIG. 19 shows the vehicle seat in an end seat position corresponding to the end position of the basic structure shown in FIG. 18, in a very schematic view;

FIG. 1 shows components of the kinematic system K of the vehicle seat designed according to the invention, in a schematic exploded view. The kinematic system K comprises a backrest pivoting joint GL for rotating the backrest fitting 10 which rotates together with the seatback about an upper pivot pin.

Figure 1:
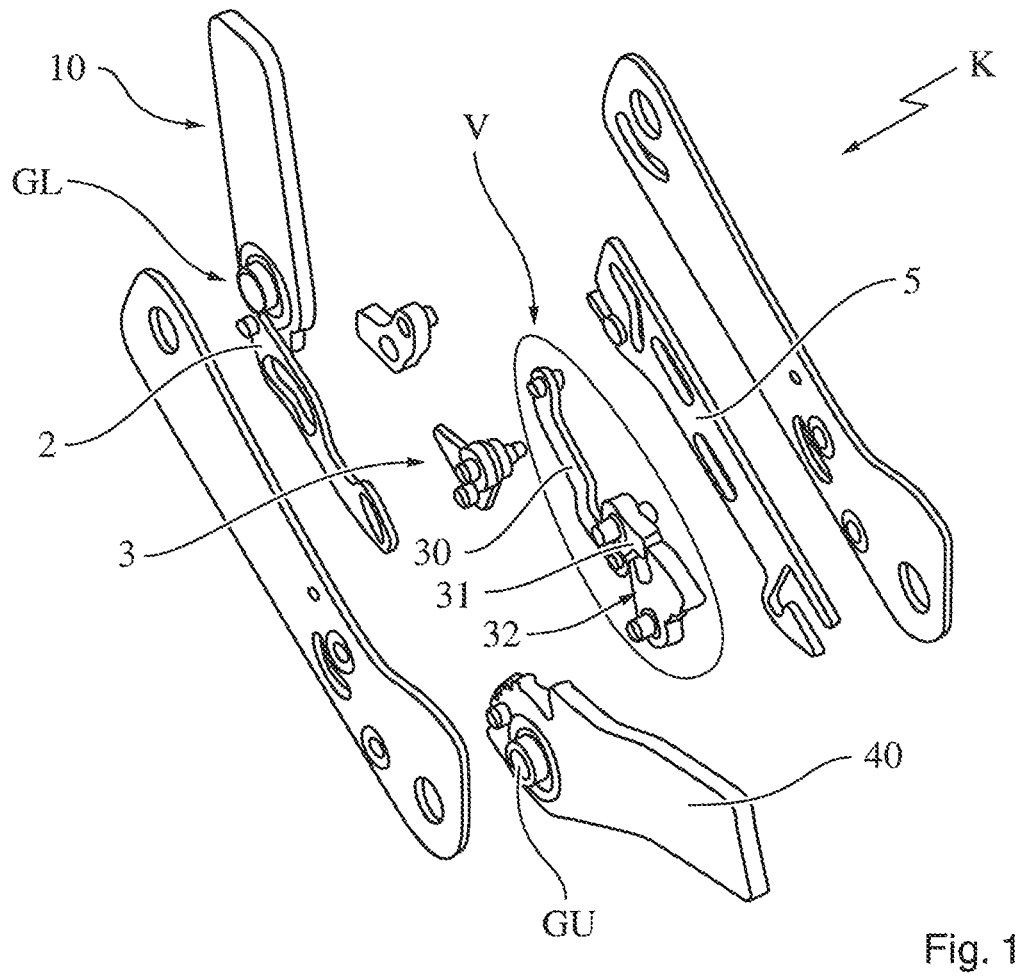
FIG. 1 shows components of the kinematic system of the vehicle seat designed according to the invention, in a schematic exploded view.

The backrest pivoting joint GL is mechanically coupled to a pull arm 2 so that a rotational movement of the backrest pivot joint GL may be transmitted to the pull arm 2.

The kinematic system K further comprises a release member 3 which is operatively connected via the pull arm 2 to the backrest pivoting joint GL.

A lower pivoting joint GU is connected fixedly in terms of rotation to a lower fitting 40 which is fixed relative to the vehicle body, on which a seat part 4, shown for example in FIG. 3, is mounted.

The kinematic system K further comprises a lower locking unit VU for the releasable locking Of the lower pivoting joint GU. The locking unit VU comprises, in turn, a release arm 30, a locking cam 31 and a locking claw 32. By means of an upper locking unit VL, the fitting 10 and thus the seatback can be fixed relative to the intermediate part.

A sliding strut 5 is provided with a guide slot which serves for guiding the release arm 30.

FIG. 2 shows in a schematic sectional view the basic structure B of the vehicle seat F in a use position which is advantageous for the vehicle occupants for traveling. The basic structure B comprises the backrest fitting 10 which is connected in an articulated manner to an intermediate part 6 via the backrest pivoting joint GL. The intermediate part 6 is articulated on the lower fitting 40 in a rotatable manner about a lower pivot pin via the lower pivoting joint GU.

The basic structure B comprises an upper locking device for the releasable locking of the backrest pivoting joint GL and a lower locking device V for the releasable locking of the lower pivoting joint GU.

The backrest pivoting joint GL is unlocked in this use position of the basic structure B which is advantageous for a vehicle occupant when traveling, whilst the lower pivoting joint GU is locked. As a result, for comfort adjustment the seatback may be altered in its angle of inclination $\alpha$.

A control slot 20 in the pull arm 2 serves for the movable guidance of the release member and thus permits ultimately the pivoting of the backrest fitting 10 within a specific pivoting range for the comfort adjustment of the seatback 1 without any effect on the upper locking device or on the lower locking device V during this comfort adjustment. The locking cam 31 bears against a stop lug 33 of the locking claw 32 and holds the locking claw 32 in a position in which a first toothed portion 34 provided on the locking claw cooperates with a second toothed portion 35 operatively connected to the lower pivoting joint GU, in order ultimately to lock the lower pivoting joint GU in this manner.

FIG. 3 shows in a very schematic view a vehicle seat F in a use position of the seat, which corresponds to the use position of the basic structure B shown in FIG. 2. The vehicle seat F comprises a seat part 4 and the seatback 1 connected via the intermediate part 6 to the seat part 4, which rotates with the backrest fitting 10.

FIG. 4 shows the basic structure B of FIG. 2, with the backrest fitting 10 slightly folded forward by the angle of inclination α relative to FIG. 2. The backrest pivoting joint GL is unlocked, as before, whilst the lower pivoting joint GU is still locked.

FIG. 5 shows in a very schematic view the vehicle seat F in a seat position which corresponds to the position of the basic structure B shown in FIG. 4.

FIG. 6 shows the basic structure B of FIG. 4 with the backrest fitting 10 folded forward further (greater angle of inclination α). The backrest pivoting joint GL is unlocked, as before, whilst the lower pivoting joint GU is still locked.

FIG. 7 shows in a very schematic view the vehicle seat F' in a seat position which corresponds to the position of the basic structure B shown in FIG. 6.

FIG. 8 shows the basic structure B of FIG. 6, with the backrest fitting 10 folded even further forward (even greater angle of inclination α). From this position of the backrest fitting 10 the pull arm 2 operatively connected to the backrest pivoting joint GL acts on the release member, which in turn forces a pin provided on the release arm 30 into the guide slot of the sliding strut. As a result, the release arm 30 begins to act on the lower locking device V such that the locking cam 31 penetrates a locking recess 36 provided on the locking claw 32, whereupon the locking claw 32 is able to bend back to the rear, away from the lower pivoting joint GU, and thus the first toothed portion 34 begins to move away from the effective region of the second toothed portion 35, in order to transfer the lower pivoting joint GU from the locked state into the unlocked state.

FIG. 9 shows the vehicle seat F in a seat position corresponding to a position of the basic structure B shown in FIG. 8, in a very schematic view.

FIG. 10 shows the basic structure B of FIG. 8 with the backrest fitting 10 folded forward even further (even greater angle of inclination α). The locking cam 31 has penetrated even deeper into the locking recess 36, whereby the locking claw 32 has been able to bend back even further to the rear.

FIG. 11 shows the vehicle seat F in a seat division corresponding to the position of the basic structure B shown in FIG. 10, in a very schematic view.

FIG. 12 shows the basic structure B of FIG. 10 with the backrest fitting 10 folded forward even further (even greater angle of inclination α). The locking cam 31 has now fully penetrated the locking recess 36, so that the locking claw 32 has been able to bend back sufficiently far to the rear that the first toothed portion 34 and the second toothed portion 35 are now out of engagement with one another and thus the lower pivoting joint GU is unlocked. The backrest pivoting joint GL is still held by a slider in the unlocked state, but the backrest fitting 10 is now in a ready-to-lock position. After unlocking the lower pivoting joint GU, the intermediate part 6 rotates with the backrest fitting 10 about the lower pivot pin.

FIG. 13 shows in a very schematic view the vehicle seat F in a seat position which corresponds to the position of the basic structure B shown in FIG. 12.

FIG. 14 shows the basic structure B of FIG. 12 with the backrest fitting 10 folded forward even further (even greater angle of inclination α). The lower pivoting joint GU initially still remains in the unlocked state, until it is transferred with continued movement of the backrest into a second locked position (alteration of the angle β). Before reaching this second locked position, however, firstly the lower locking device V is brought into a ready-to-lock position, initially as a result of the movement of the backrest, and secondly the rotation of the intermediate part 6 is limited about the lower pivot pin by a second stop. In this case, the kinematic system K is designed so that the backrest pivoting joint GL and the lower pivoting joint GU are only automatically locked by the locking devices, which are assigned in each case thereto, after reaching the second stop. The slider coupled to the relative movement of the lower fitting 40 relative to the intermediate part is moved back, whereupon the backrest pivoting joint GL begins to rotate into a locked position. The backrest fitting 10 is now in abutment with a first stop so that a further forward movement of the backrest fitting 10 and thus of the seatback 1 is blocked.

FIG. 15 shows in a very schematic view the vehicle seat F in a seat position which corresponds to the position of the basic structure B shown in FIG. 14.

FIG. 16 shows the basic structure B of FIG. 14 with the backrest fitting 10 folded forward even further (even greater angle of inclination β). The slider has been moved back even further and the backrest pivoting joint GL rotates again into its locked position.

FIG. 17 shows in a very schematic view the vehicle seat F in a seat division corresponding to the position of the basic structure B shown in FIG. 16.

FIG. 18 shows the basic structure B of FIG. 16 with the backrest fitting 10 folded further forward into the horizontal end position. The backrest pivoting joint GL and the lower pivoting joint GU are now latched in each case in a locked position.

In order to release the locking of the backrest pivoting joint GL and the lower pivoting joint GU in this end position of the vehicle seat F, it is necessary for the user to release, for example manually or via any actuator, the locking of the lower pivoting joint GU, after which the seat may be adjusted again into the initial position i.e. into the use position. The upper pivoting joint GL is automatically unlocked with the rearward movement of the seatback.

FIG. 19 shows in a very schematic view the vehicle seat F in an end seat position which corresponds to the end position of the basic structure shown in FIG. 18. The seatback 1 which is locked in position is now arranged approximately horizontally over the seat part 4. The front face of the seatback 1 and the upper face of the seat part 4 face one another.

FIG. 20

Figure 20:
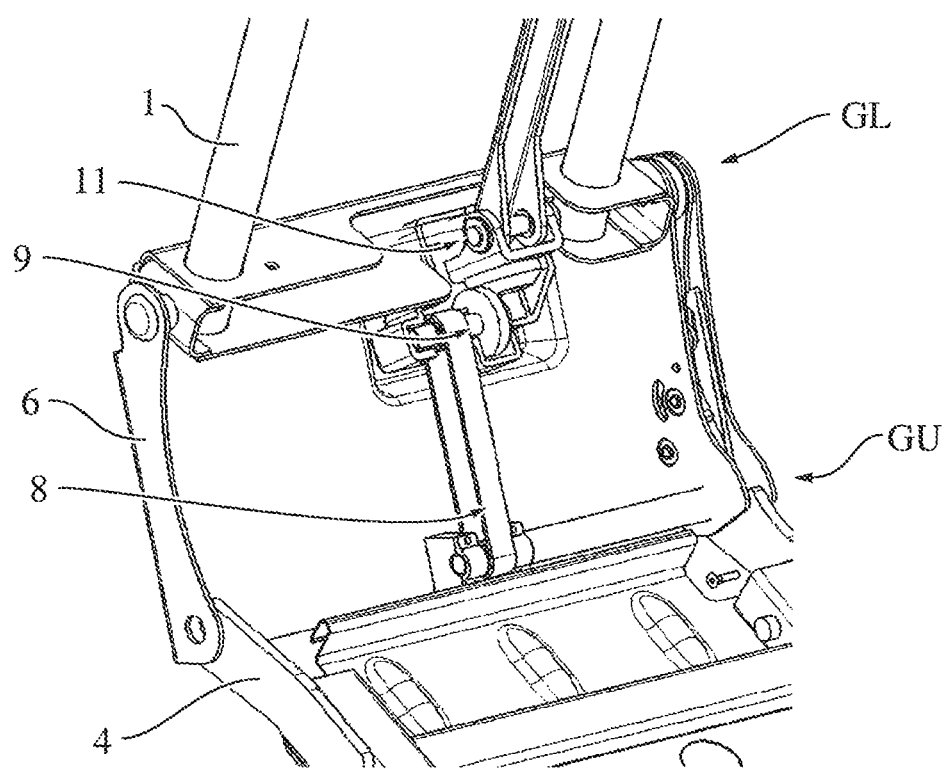
FIG. 20 shows the lengthening and shortening of the seatback.

A preferred or an additional separate subject of the present invention is shown in FIG. 20, in which the seatback 1 when folded forward from the use position into the stowed position is shortened, and/or in reverse, lengthened. By moving the seatback 1 forward, in particular by a rotation of the second component 6 about the lower pivoting joint GU, a force transmission means 8, in this case a toothed belt, is driven which directly or indirectly transmits the force or the torque to a gear mechanism 9, in this case a bevel gear mechanism, which drives the longitudinal adjustment of the seatback 1.

In the exemplary embodiment set forth, according to FIGS. 1-20, only mechanical components are used in the kinematic system. However, it is clear to the person skilled in the art that the essential functions of the invention discussed above may naturally be implemented, for example, by other devices, such as for example by a mechatronic system.

LIST OF REFERENCE NUMERALS

1 First component, seatback
2 Pull arm
3 Release member
4 Base part, seat part
5 Sliding strut
6 Second component, intermediate part
7 Latching means, locking cam
8 Force transmission means, toothed belt
9 Gear mechanism
10 Backrest fitting
11 Joint
30 Release arm
31 Latching means, locking cam
32 Locking claw
33 Stop lug
34 Toothed portion
35 Toothed portion
36 Locking recess
40 Fitting
B Basic structure
F Vehicle seat
GL First rotational means, backrest pivoting joint
GU Second rotational means, pivoting joint
VL Locking device of the first rotational means
VU Locking device of the second rotational means
α Angle between the first and the second component
β Angle between the second component and the base part

The invention claimed is:

1. A method for shifting a first component and a second component relative to a base part, from a use position via an easy entry position to a stowed position, wherein the first component is a seatback and the base part is a seat part of a vehicle seat, wherein the first and the second component are connected to each other by a first rotational means and the second component and the base part are connected to each other by a second rotational means, wherein the first and second rotational means are automatically locked and unlocked depending on at least one position of the first component relative to the second component and/or of the second component relative to the base part, wherein the first rotational means is unlocked in the use position, wherein the first rotational means is mechanically coupled to a pull arm so that a rotational movement of the first rotational means is transmitted to the pull arm, wherein a release member is operatively connected via the pull arm to the first rotational means, wherein a control slot in the pull arm serves for movable guidance of the release member and thus permits the pivoting of the first component within a specific pivoting range for comfort adjustment.

2. The method as claimed in claim 1, characterized in that in a first position the first component is shifted, by an angle (α), relative to the second component and the second component remains locked in a first position relative to the base part.

3. The method as claimed in claim 1, characterized in that the locking takes place by a latching means.

4. The method as claimed ire claim 1, characterized in that with a movement of the first component and the second component relative to one another, and/or with a movement of the second component relative to the base part, the first component is automatically shortened or lengthened.

5. The method as claimed in claim 1, characterized in that when rotating the first component beyond a specific angle (a), the second rotational means is automatically unlocked and/or the first component is brought into contact with a stop provided on the second component.

6. The method as claimed in claim 5, characterized in that with a relative movement between the second component and the base part, a locking means of the first component is automatically brought into a lockable position.

7. The method as claimed in claim 6, characterized in that a locking means of the second component is also automatically brought into a lockable second position.

8. The method as claimed in claim 7, characterized in that both the first and the second components are automatically locked in their respective positions after the first component has reached an end position of a use position, wherein the seatback is provided substantially perpendicular to the seat part, or a stowed position wherein the seatback is provided substantially parallel to the seat part.

9. The method as claimed in claim 8, characterized in that the components are unlocked in a manual or motorized manner.

10. The method as claimed in claim 9, characterized in that the locking of the first component takes place automatically with a movement of the second component and the base part relative to one another.

11. A vehicle seat comprising a seatback, an intermediate part and a base part, wherein the base part is a seat part, wherein the seatback can be shifted relative to the base part from a use position via an easy entry position to a stowed position, wherein the seatback and the intermediate part are connected to each other by a first rotational means and the intermediate part and the base part are connected to each other by a second rotational means, which are able to be locked in at least one position by a first and second locking means, wherein the locking means are operatively connected by a connecting means so that with a relative movement between the seatback and the intermediate part, and/or the intermediate part and the base part, at least one of the first and second locking means is automatically locked and unlocked, wherein the first rotational means is unlocked in the use position, wherein the first rotational means is mechanically coupled to a pull arm so that a rotational movement of the first rotational means is transmitted to the pull arm, wherein a release member is operatively connected via the pull arm to the first rotational means, wherein a control slot in the pull arm serves for movable guidance of the release member and thus permits the pivoting of the seatback within a specific pivoting range for comfort adjustment.

12. The vehicle seat as claimed in claim 11, characterized in that the locking takes place by a latching means.

13. The vehicle seat as claimed in claim 11, characterized in that the connecting means are moved in a purely translatory manner.

14. The vehicle seat as claimed in claim 11, characterized in that the locking means of the intermediate part and the base part is also automatically brought into a lockable second position when the locking means of the seatback and the intermediate part is brought into a lockable position.

15. The vehicle seat as claimed in claim 11, characterized in that when rotating the seat back beyond a specific angle (α), the second rotational means is automatically unlocked and/or the seat back is brought into contact with a stop provided on the intermediate part.

16. The vehicle seat as claimed in claim 11, characterized in that in a first position the seat back is shifted, by an angle (α), relative to the intermediate part and the intermediate part remains locked in a first position relative to the base part.

17. The vehicle seat as claimed in claim 16, characterized in that with a relative movement between the intermediate part and the base part, a locking means of the seat back is automatically brought into a lockable position.

18. The vehicle seat as claimed in claim 17, characterized in that a locking means of the intermediate part is also automatically brought into a lockable second position.

19. The vehicle seat as claimed in claim 18, characterized in that both the seat back and the intermediate part are automatically locked in their respective positions after the seat back has reached an end position of a use position, wherein the seatback is provided substantially perpendicular to the seat part, or a stowed position wherein the seat back is provided substantially parallel to the seat part.

* * * * *

UNITED STATES PATENT AND TRADEMARK OFFICE
CERTIFICATE OF CORRECTION

| | | |
|---|---|---|
| PATENT NO. | : 8,974,001 B2 | Page 1 of 1 |
| APPLICATION NO. | : 13/387132 | |
| DATED | : March 10, 2015 | |
| INVENTOR(S) | : Michael Fahl | |

It is certified that error appears in the above-identified patent and that said Letters Patent is hereby corrected as shown below:

In the Claims

Column 07, Line 61, Claim 4, "ire" should be "in"

Signed and Sealed this
Twenty-third Day of June, 2015

Michelle K. Lee
*Director of the United States Patent and Trademark Office*